Jan. 12, 1954  I. E. ASKE  2,666,090
THERMOCOUPLE
Filed Dec. 3, 1951

INVENTOR
Irving E. Aske
BY
ATTORNEY

Patented Jan. 12, 1954

2,666,090

UNITED STATES PATENT OFFICE 2,666,090

THERMOCOUPLE

Irving E. Aske, Muskegon, Mich., assignor of one-half to Karl W. Fitzpatrick, North Muskegon, Mich.

Application December 3, 1951, Serial No. 259,583

5 Claims. (Cl. 136—5)

This invention relates to improvements in thermocouple.

The main objects of this invention are:

First, to provide a thermocouple having a relatively large millivolt output per degree change in temperature.

Second, to provide a thermocouple having a millivolt output which is uniformly proportional to change in temperature from below zero temperatures to above zero temperatures of the order of $-114°$ F. to $350°$ F.

Third, to provide a thermocouple that is electrically stable in its voltage output over a long period of continuous use.

Fourth, to provide a thermocouple that is metallurgically stable in the crystalline structure of the metals constituting the same and one which maintains flexibility over a long period of use.

Fifth, to provide a thermocouple that resists oxidation throughout its entire range of thermal operation.

Sixth, to provide a thermocouple in which the joint or junction of the two metal elements can be easily obtained by a fusion of the metals.

Seventh, to provide a thermocouple which is highly sensitive for quick thermal response.

Eighth, to provide a thermocouple that has a relatively high thermal resistance.

Further objects, and objects relating to details and economies of the invention will appear from the description to follow. The invention is defined and pointed out in the claims.

An embodiment of the invention is illustrated in the accompanying drawing, in which Fig. 1 is a chart illustrating the constant millivolt output of the thermocouple of my invention from approximately $-114°$ to $350°$ F., the reference junction being $32°$ F., the portion of the line below the reference junction being shown by dash line and the above by continuous line, the output being scaled in millivolts.

Figure 1:
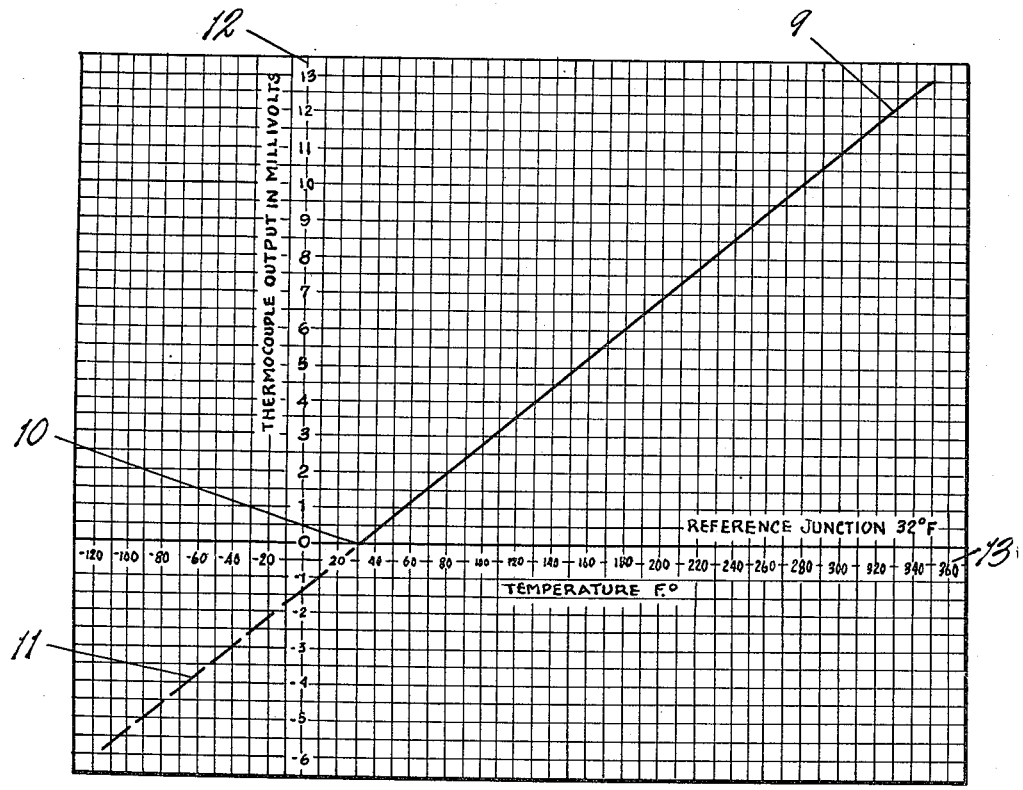

In the accompanying drawing applicant illustrates his invention mainly in conventional form. The chart in Fig. 1 is an accepted form of chart and is presented to show the uniformly proportioned millivolt output of applicant's thermocouple from a point as low as $114°$ F. below zero to approximately $350°$ above. These limits are here used as they cover the general range of use to which the applicant's thermocouple would be put, and with no danger of fusing the thermocouple elements employed by the applicant.

Applicant is aware that thermocouples have been widely used for different purposes and with elements formed of various metals and metal alloys designed to be sensitive, and designed to obtain as near a constant ratio of output as was possible, but so far as applicant is aware none of them has been successful in securing or maintaining a constant ratio of output through the range of temperatures for which they were designed to be used. A consideration of the graphic charts of these thermocouples discloses that the millivolt output per degree change in temperature is variable and increases in voltage relationship as the temperature rises and decreases as the temperature diminishes to sub-zero values. Briefly stated, the output of all thermocouples of which the applicant is aware both descriptively and in commercial use produce electrical potentials that are not strictly proportional to temperature change, and therefore do not have a constant "K" factor of millivolt per degree over their respective operating ranges, and therefore no electrical instrument has been made having a uniformly divided scale for indicating temperatures, and therefore no highly accurate temperature measurements are possible either by direct measurement or by interpolation of voltage output measured by a potentiometer. A variable "K" factor can only give an approximate temperature.

There are many situations or conditions where thermocouples have been used or are usable where a straight line characteristic between millivolt output and temperature change would be of great value, and applicant's thermocouple achieves that result. The applicant's thermocouple is composed of constants, in the preferred structure a negative element of an alloy of bismuth and nickel, consisting of 99.88% bismuth and .12% nickel, and a positive element of 92½% tin and 7½% antimony. These percentages are given as the preferred form. The alloy of the negative element is essentially bismuth so far as its electrical characteristics are concerned. However, the percentage of nickel permits the drawing of the element in the form of a flexible wire, that is the element is flexible and may be bent or coiled if desired, whereas a pure bismuth element of the desired wire form is brittle or fragile. The alloy is substantially that of the Aske & Fitzpatrick application, Serial #150,346, filed March 17, 1950. This alloy is highly ductile and strong, and can be extruded into a fine wire, and it resists oxidation up to the limit of its operating range of temperature of approximately 350° F. The tin antimony alloy is also highly ductile and can be extruded into a fine wire and it resists oxidation up to the limit of its operating temperature of 350° F.

Figure 2:
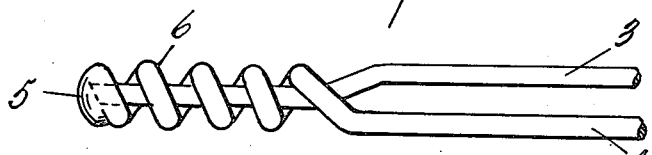
Fig. 2 is an enlarged fragmentary view of an embodiment of my invention.
Figure 3:
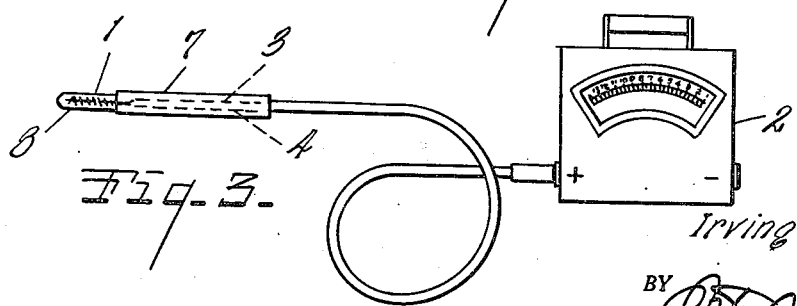
Fig. 3 is an elevational view of a thermocouple of my invention associated with a potentiometer which is conventionally shown, the thermocouple being also mainly conventionally shown.

The thermocouple is indicated generally by the numeral 1 in Fig. 3, a potentiometer with which it is associated is indicated at 2. The bismuth elements of the thermocouple is indicated at 3 in Fig. 2, and the tin and antimony alloy element at 4 in Fig. 2. These elements are joined together by a fused union or bond 5 so that in effect a homogeneous metal bond results. It is desired to point out, however, that while this fused joint or bond is preferred and is advantageous, quite satisfactory results may be had with a bond formed with a relatively low melting point solder.

In the embodiment illustrated the element 4 is coiled around the element 3 at 6 to relieve the bond of stress, and in practice a sleeve 7 is arranged over the thermocouple elements to protest them from shock, and to protect them in handling. However, the end of the thermocouple should be exposed as indicated at 8 so that it may be placed directly in contact with the part being tested, for example, it may be used for exploring variations in temperatures of the body by the medical profession, but it has many uses in scientific research where accuracy is an important factor.

In the chart or graph presented in Fig. 1 it will be noted that line 9 above the 32 reference junction indicated at 10 and the dash line 11 below that point are straight continuations, one of the other. The applicant's thermocouple or instrument secures that result, the chart being made or platted from the use of one of the applicant's instruments. The thermocouple output in millivolts is indicated in the column 12, and the temperature is indicated in the horizontal column 13. This graph shows the straight line relationship of millivolt output and temperature and factor "K" equalling .040 millivolt per degree change in temperature Fahrenheit, and that it is constant throughout the entire operating range of temperatures. It is desired to point out, however, that the constant "K" factor .040 of the graph is possibly subject to error as it was established through recordings of a calibrated thermocouple in which one element was iron and the other constantan, which does not have a constant "K" factor. However, the applicant employed what he considers is the best available means of establishing the constant "K" and the graph is submitted mainly for illustration purposes.

While the applicant prefers the bismuth nickel alloy as stated because of its ductility, pure bismuth is considered equally good in providing a constant "K" factor. For highly accurate measurements it is advantageous to connect a plurality of the thermocouples in series so as to give large deflections on the recording instrument.

I have illustrated and described my invention in a highly practical embodiment thereof. I have not attempted to illustrate or describe other adaptations or embodiments which I contemplate, as it is believed this disclosure will enable those skilled in the art to embody or adapt the invention as may be desired.

Having thus described my invention, what I claim as new and desire to secure by Letters Patent is:

1. A thermocouple, the negative element of which is of bismuth and the positive element of which is an alloy of 92½% tin and 7½% antimony, the elements being bonded together by fusion of the metals thereof.

2. A thermocouple, one element of which is of bismuth and the other element of which is of an alloy of tin and antimony having approximately 90% tin and 10% antimony, the elements being fusedly joined.

3. A thermocouple, one element of which is formed of bismuth alloyed with nickel and the other element of which is formed of an alloy of tin and antimony, the approximate percentages being 90% tin and 10% antimony, the elements being fusedly joined.

4. A thermocouple, one element of which is formed of an alloy of bismuth and nickel in the ratio of aproximately 99.88% bismuth and .12% nickel and the other element of which is formed of an alloy of tin and antimony consisting of the order of 90 to 95% tin and 10 to 5% antimony, the elements being joined together by a fusion of the metals thereof.

5. A thermocouple, one element of which is formed of bismuth alloyed with nickel and the other element of which is formed of an alloy of tin and antimony consisting of the order of 90 to 95% tin and 10 to 5% antimony, the elements being joined together by fusion of the metals thereof.

IRVING E. ASKE.

References Cited in the file of this patent

UNITED STATES PATENTS

| Number | Name | Date |
|---|---|---|
| 650,062 | Gottscho | May 22, 1900 |

OTHER REFERENCES

Caswell, International Critical Tables, vol. 6, pp. 214, 217, 218, 221, 222.

The Iron Age, p. 35, Jan. 21, 1943.

Hansen, Aufbauder Zweistofflegierungen, p. 1044, Edward Brothers, Inc., Ann Arbor, Michigan, 1943.